Aug. 19, 1924.

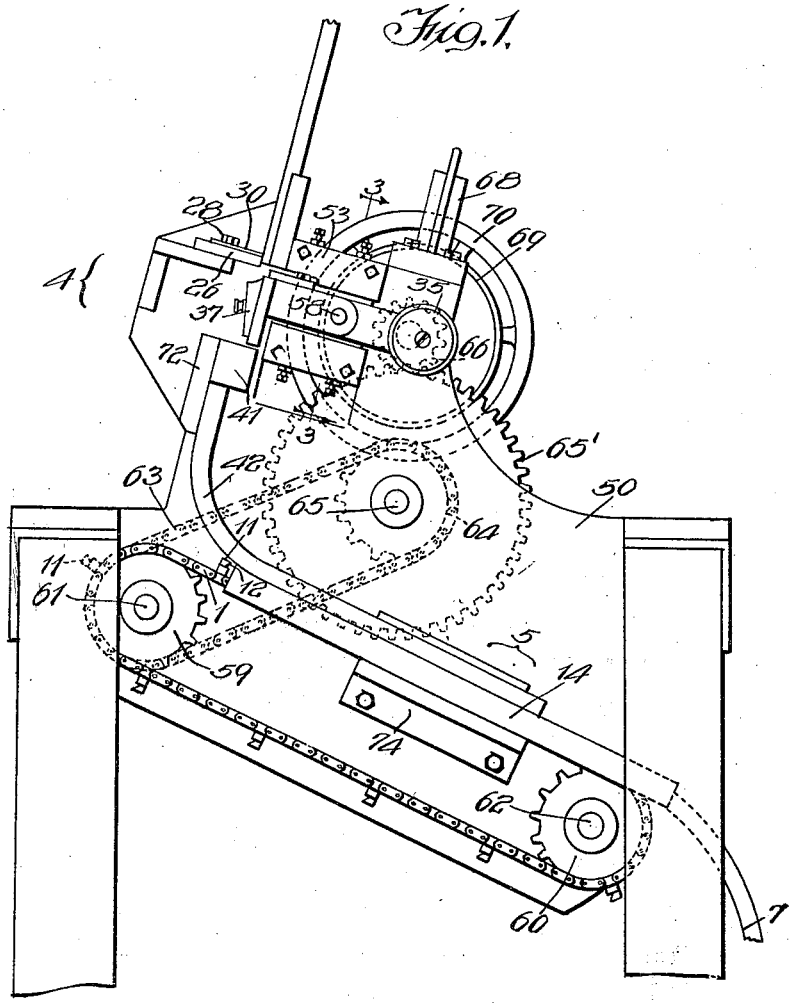

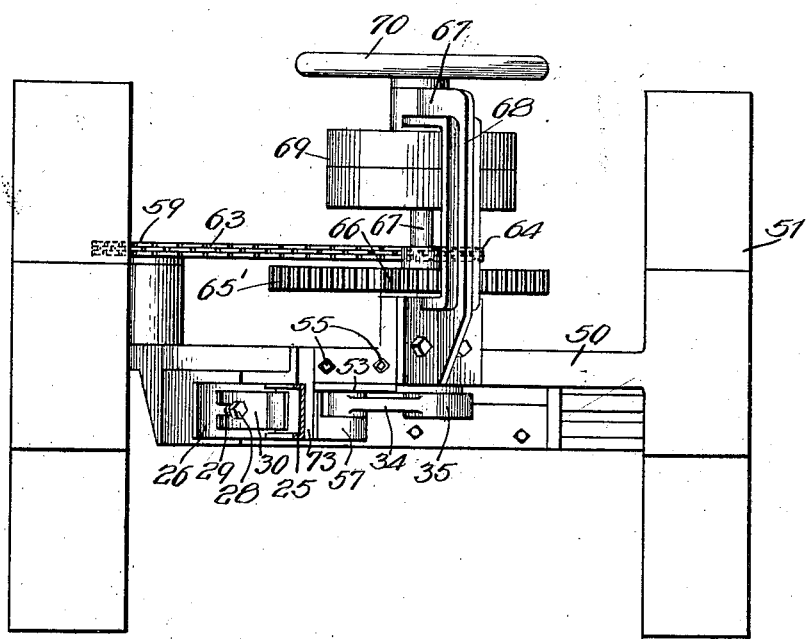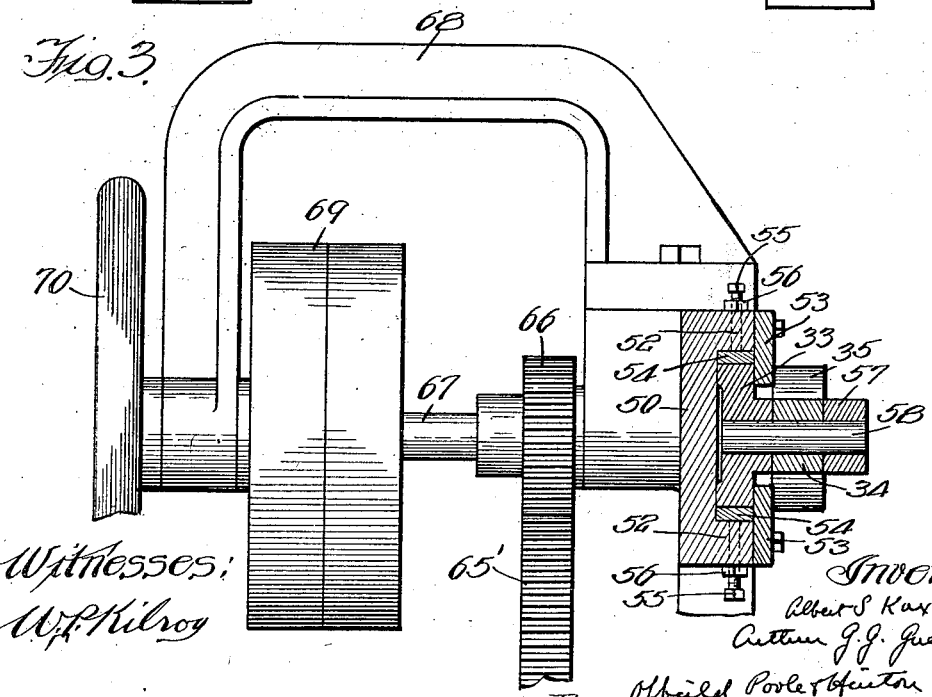

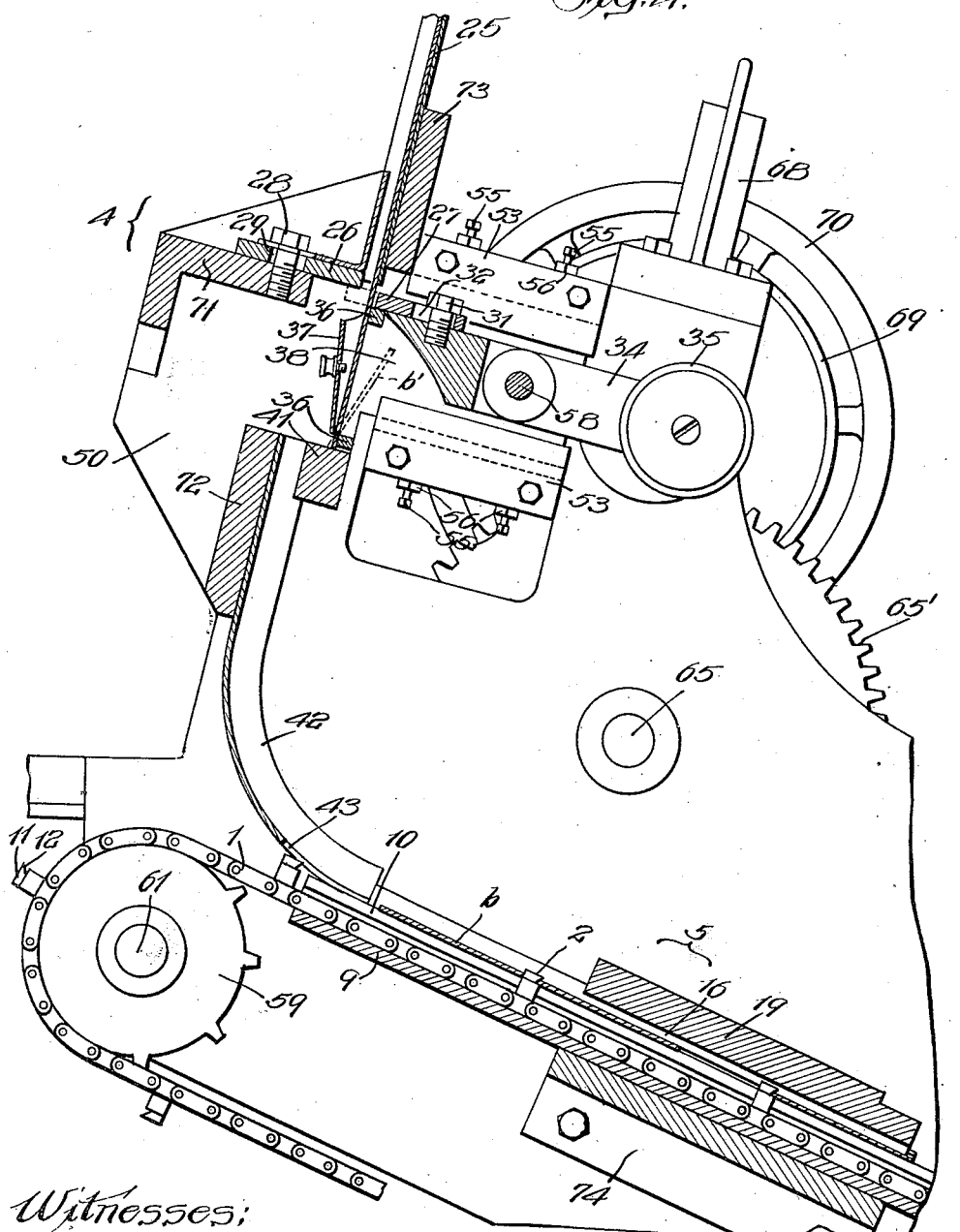

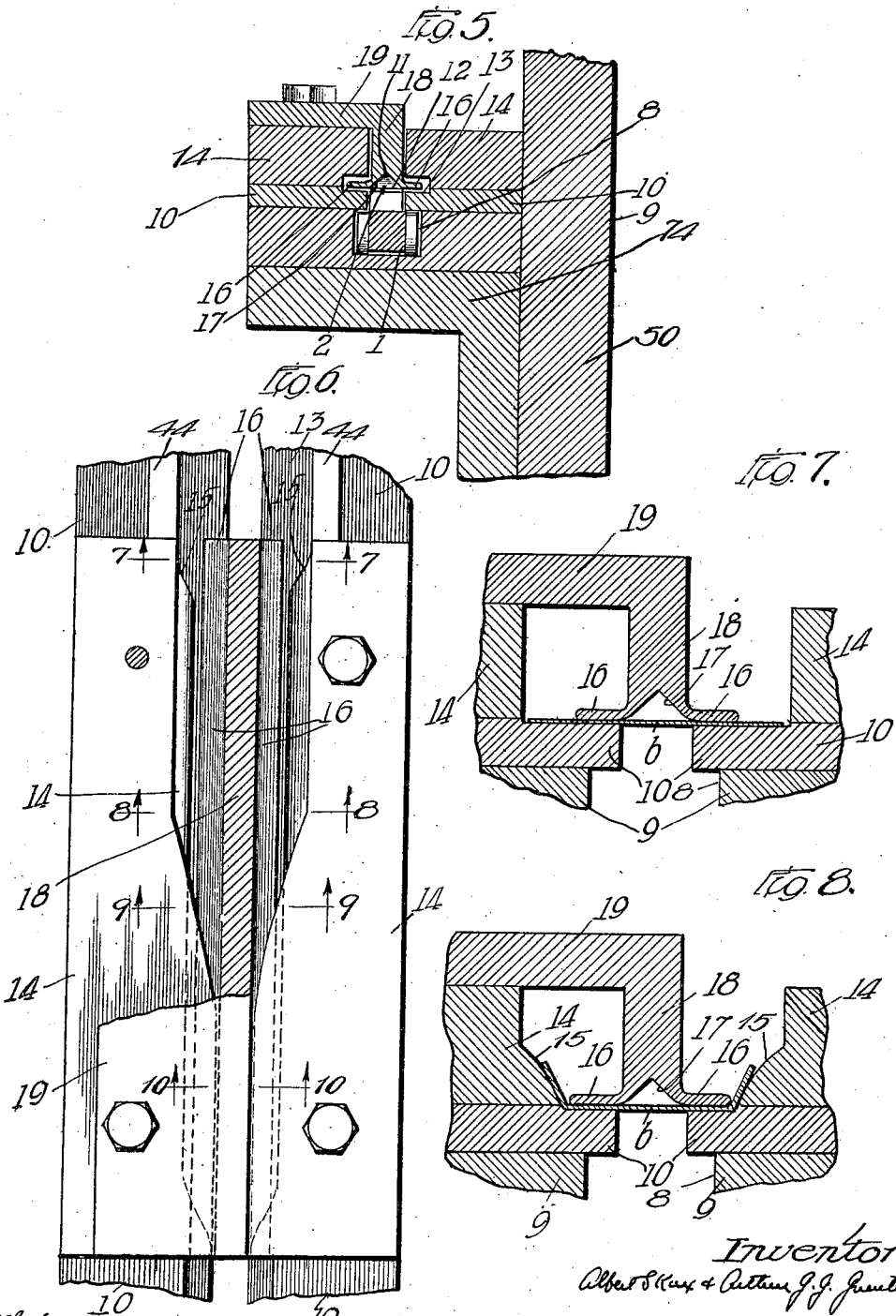

A. S. KUX ET AL 1,505,207

MACHINE FOR MAKING REENFORCING GIRTHS

Filed June 21, 1920   5 Sheets-Sheet 5

Witnesses:
W. F. Kilroy

Inventor:
Albert S. Kux and
Arthur G. J. Guenther
By Offield Poole and Hunter
Attys Patented Aug. 19, 1924.

1,505,207

UNITED STATES PATENT OFFICE.

ALBERT S. KUX, OF CHICAGO, ILLINOIS, AND ARTHUR G. G. GUENTHER, OF GRAND JUNCTION, COLORADO, ASSIGNORS TO SIGNODE SYSTEM, INCORPORATED, OF CHICAGO, ILLINOIS, A CORPORATION OF DELAWARE.

MACHINE FOR MAKING REENFORCING GIRTHS.

Application filed June 21, 1920. Serial No. 390,585.

*To all whom it may concern:*

Be it known that we, ALBERT S. KUX and ARTHUR G. G. GUENTHER, citizens of the United States, and residents of Chicago, in the county of Cook and State of Illinois, and Grand Junction, in the county of Mesa and State of Colorado, respectively, have invented certain new and useful Improvements in Machines for Making Reenforcing Girths, of which the following is a full, clear, concise, and exact description, reference being had to the accompanying drawings, forming a part of this specification.

This invention relates to machines for making reenforcing girths suitable to be used as a part of sealed joints for tension resisting box strapping or the like.

As its main object, the invention is intended to provide a highly efficient and practicable machine for rapidly producing such girths in quantities.

The character of the invention will be understood by reference to one form of machine embodying the invention adapted for making one form of girth, both of which are shown for illustration in the accompanying drawings.

Referring to the drawings:—

Fig. 1 is a side elevation of the illustrative machine,

Fig. 2 is a plan view of the same,

Fig. 3 is a sectional view on the line 3—3 of Fig. 1,

Fig. 4 is an enlarged cross section of the upper end of the machine,

Fig. 5 is an enlarged cross section of the forming means,

Fig. 6 is a sectional plan view of the forming mechanism for the reenforcing girths, Figs. 7, 8, 9, and 10 are cross sections taken respectively on the several lines indicated on Fig. 6.

Figure 9:
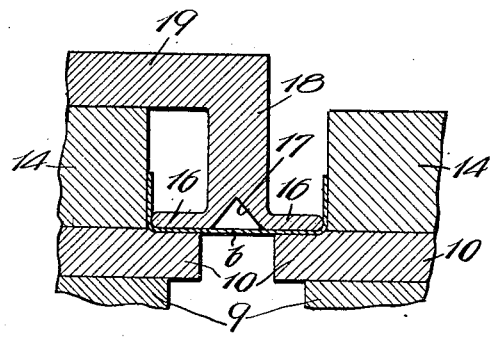
Figure 10:
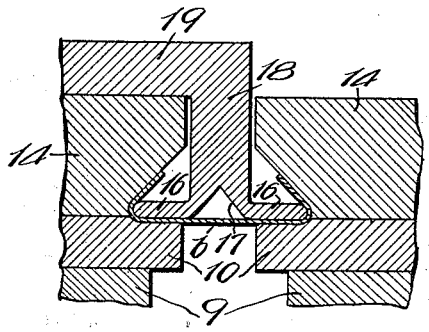
Figure 11:
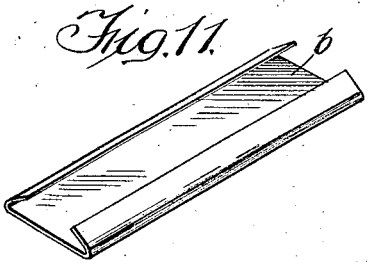
Fig. 11 is a perspective view of a completed girth.

The illustrative machine is designed to receive sheet metal strips of girth material, sever them into sections and form the severed sections, which may be termed blanks, into reenforcing girths of the character shown in Fig. 11, which are adapted to be slipped over the overlapped ends of box strapping and crimped, indented or sealed therewith as a part of a box strapping joint.

Referring to Figs. 1, 4 and 6, a chain conveyer 1, having spaced teeth 2, is interposed between the strip cutting mechanism, designated generally as 4, and the girth forming mechanism, designated generally as 5. Any convenient lengths of material are fed to the cutting mechanism, preferably by gravity, severed into blanks $b$ of appropriate length, and the blanks delivered to the chain conveyer and carried thereby through the girth forming means. The finished girth, in the condition shown in Fig. 11 is delivered on a chute 7 leading to any appropriate receptacle. Various stages in the girth forming operation are represented in Figs. 7–11.

As shown in Figs. 4 and 5 the upper reach of the chain conveyer runs in a groove 8 of a supporting and guide plate 9. The conveyer teeth 2, which successively push the severed blanks through the forming dies or mandrels, project above said plate and are accommodated in a slot between two plates 10 supported on the plate 9. The teeth are pointed at their upper ends 11, and provided with notches 12 in their forward faces (Fig. 4) which engage and push the rear edges of the blanks. The slot between the plates 10 is narrower than the blanks, and they will therefore slide along on said plates, impelled by the conveyer teeth 2, and be forced through the mandrels hereinafter to be described. In order to keep the blanks correctly aligned at all times during their progress, a shallow channel 13 (Fig. 8) is provided therefor in the plate 10, about the depth of a blank and of such width as to permit the blank to slide easily but properly aligned therein. As is apparent from Fig. 4, the plates 10 extend well back of the point of delivery of the blanks from the cutter, so that immediately after leaving the cutter the blanks slide down into the channel 13.

The girth forming means comprising a pair of formers 14 secured upon the plates 10 by bolts which extend through said plates and into the plate 9 below them. These formers are shorter than the plates 10 and located toward the delivery end thereof. Their construction will be understood from Figs. 6–10 inclusive, which show a plan view of the formers and their cross section at different points. The blank as delivered by the cutting mechanism is wider than the finished girth. The formers serve to bend over the two edges of the blank b shown in Figs. 8–10, as it is forced through the formers by the conveyer chains, and deliver this blank formed as shown in Fig. 11. For this purpose the channel 13 and the formers 14 are provided with a gradually narrowing throat 15 which serves to form up the blank b, which throat includes a gradually closing top overhang which forms and completes the blank into the form shown in Fig. 11. Thus the formers provide a passage shaped to gradually bend up and inwardly the edges of the blank as it is forced therethrough.

To render the operations uniform and perfect, the blank is formed about a T-shaped mandrel comprising horizontal flanges 16 between and on the under side of which is a V-shaped groove 17 to accommodate the upwardly projecting points 11 of the conveyer teeth. The flanges 16 are formed integrally with the vertical flange 18 or web of an angle iron, the other flange 19 of which is suitably secured upon one of the plates 14 so that the depending web of the angle iron carries the T-shaped mandrel in the passage between the formers 14 and the plate 10, the walls of which passage, as indicated, gradually assume the shape shown at their delivery end so as to form the blank about the mandrel. It will be noted that the rear end of the T-shaped mandrel is located back of the throat 15 and high enough to clear the top surface of the blanks coming down the channel 13, so as to prevent possibility of obstruction at this point.

The material supplied to the machine to be severed and formed into girths is fed or presented in an inclined chute 25, capable of receiving a strip of convenient length in such a position that the strip will feed downward by gravity. Immediately below the chute 25 is located the cutter, herein exemplified as a reciprocating cutter having a pair of knife blades 26, 27.

The knife 26 is stationary, being adjustably mounted on the frame of the machine by the bolt 28 and slot 29, which bolt also adjustably secures the short front 30 for the chute 25.

The knife 27 is also adjustably secured by the bolt 31 and slot 32 to a knife carriage 33, reciprocated by the pitman 34 from the eccentric 35. The knife carriage 33 has hung on its rear end a hollow square plate 36 to which is attached a bucket 37, open on the side adjacent the plate 36 and provided with a handle 37 for convenient removal. The intermediate part of the carriage 33 is cut away as shown at 38 for a purpose to be described.

Thus it will be seen (Fig. 4) when the knife 27 is forward (dotted line position) the strip 8 rests upon its top when the knife 27 moves backwardly the strip 8 falls lengthwise by its own weight down the bucket 37. The strip 8 is stopped in its descent when its lower end strikes the block 41, subsequent forward movement of the knife carriage severs the strip, removing from it one blank, and moves this blank forwardly until its lower end is pushed off the block 41, whereupon the blank descends the chute 42, coming to rest as shown at b (Fig. 4) against the rear end of the tooth 2 in advance of the tooth which engages the rear of the blank and forces it through the forming means previously described. The chute 42 is slotted at its lower end as shown at 43 to accommodate the chain 1. Fences 44 secured to the plates 14 serve to confine the girths to the proper path of travel and cause them to enter the forming means properly.

It will be noted that the block 41 serves as a gauge for the length of the blank, and that the plate 26 serves to discard short blanks and prevent them being fed down the chute 42. Thus a blank $b^1$ too short to rest at its upper end against the top cross piece of the plate 41, will as the knife carriage makes a cutting stroke be tipped over (dotted lines) and fall through the space 38 and eventually to the floor.

There remains to be described only the driving gears and constructional details of the aforesaid mechanisms.

The main supporting frame is a vertical plate 50 secured on angle iron bench structure 51. This plate has cast thereon, adjacent its upper end the guides 52 (Fig. 3) for the knife carriage 33 which is housed by the bolted plates 53, and rendered adjustable between the two guides 54, positioned by means of the bolts 55 provided with lock nuts 56. The carriage 33 has a fork 57 thereon in which is revolubly mounted the rear end of the pitman 34 previously alluded to, by means of the pin 58.

The sprockets 59 on which the chain conveyer 1 is mounted, are journalled on a shaft 61 at the rear end of the machine and a stub shaft 62 at the delivery end. The shaft 61 is driven by the chain 63 from the sprocket 64 on the shaft 65, also journalled in the frame. The sprocket 64 is driven by the attached large gear 65′ meshing with the pinion 66, in the main shaft 67. The main shaft 67 is for the most part located on the opposite side of the plate 50 from the operating mechanism projecting therethrough however to carry the eccentric 35 (Fig. 4) previously described. The main shaft is supported at its other end in the sling 68, bolted to the top of the plate 50, and carries the driving pulleys 69 and the hand wheel 70. The knife 26 is supported on a flange 71, cast with the plate 50, as is the block 41, and the backing flange 72 for the chute 42 and the backing flange 73 for the chute 25.

All of the forming mechanism is supported on the angle plate 74, bolted to the frame plate 50 (Fig. 5).

Having described our invention, we claim:

1. A machine of the class described comprising, in combination, forming devices for forming reenforcing girths, means to carry the girth material successively to said forming devices, severing means for severing a strip of girth material into sections each adapted to form a single girth, means for causing a gravity feed of the girth material to said severing means, and means for transferring the severed sections of girth material successively to the carrying means to be carried thereby to the forming devices.

2. A machine of the class described comprising, in combination, forming devices, means to carry girth material to said forming devices, a gravity feed to feed strips of girth material to said carrying means, and severing devices interposed in said feed and adapted automatically to sever said strips into pieces each adapted to form a single girth, during the feed of the girth material to the carrying means.

3. A machine of the class described comprising, in combination, a feed chute for a strip of girth material, a cutter for successively severing girth blanks from the strip, means for causing advance of the strip to present uniform lengths to be severed by the cutter, girth forming means, a guide and conveyer leading thereto, and means forming part of said cutter for delivering the severed blanks into said guide to be forwarded by said conveyer to and through said girth forming means.

4. In a machine of the character described, means for forming reenforcing girths from blanks, means for severing a strip into said blanks, and means for maintaining said strip in an inclined position adapted to slide automatically and by gravity to said severing means.

5. In apparatus of the class described, a forming device for forming reenforcing girths for box strapping or the like from blanks, said forming device comprising a central mandrel of substantially uniform cross section throughout its length, and a pair of dies arranged in such relation to said mandrel as to receive a flat girth blank, and wrap or fold the blank about said forming member during the passage of the blank through the forming device.

6. In a machine for forming reenforcing girths, means for severing girth blanks from sheet material, means for forming said blanks into reenforcing girths, and means for discarding improperly sized blanks.

7. In a machine for forming reenforcing girths, means for severing from strips of sheet material girth blanks of appropriate length, means for subsequently forming said blanks into reenforcing girths, and means interposed between the severing means and the forming means for diverting inappropriately sized girths from the forming means.

8. In a machine for forming reenforcing girths, means for severing from sheet metal strips blanks of appropriate length to be formed into reenforcing girth, including sorting means for throwing out the short lengths and retaining the appropriate length of girth.

9. In a machine for forming reenforcing girths, a knife, a stop, said knife being adapted to sever off from sheet material a blank suitable to be formed into a reenforcing girth, a guage between the knife and the stop, and means whereby blanks shorter than the guage are automatically discarded, while blanks of the guage length are passed on through the machine.

10. A machine of the class described comprising in combination, a device for maintaining a strip of girth material in position to advance by gravity, a cutter arranged to remove an end portion of said material to form a girth blank, forming devices, means to carry said blank to said forming devices, and a gravity feed to carry said girth blank from said cutter to said carrying means.

11. In a machine for forming reenforcing girths, means for severing girth blanks from sheet metal material, means for forming said blanks into reenforcing girths, and means associated with said means for severing for discarding improperly sized blanks.

12. In a machine for forming reenforcing girths, means for severing from strips of sheet metal material girth blanks of appropriate length, means for subsequently forming said blanks into reenforcing girths, and means movable with said severing means for diverting improperly sized blanks from the forming means.

13. In a machine for forming reenforcing girths, means for severing from sheet metal strips blanks of appropriate length to be formed into reenforcing girths, and means forming part of said severing means for discarding the short lengths and retaining the appropriate length blanks.

14. A device for forming reenforcing girths for box strapping comprising a mandrel having a bead, said mandrel and bead being substantially uniform in cross section throughout their length, a pair of opposed formers arranged on opposite sides of said bead, and means for delivering a girth blank to and forcing it longitudinally through said formers, the blank engaging surfaces of said formers at the point of entrance of a blank being in a plane so as to receive a flat blank, each being provided with a changing contour arranged to roll up the lateral edges of a blank about the bead of said mandrel during the passage of a blank through said formers.

15. A device for forming reenforcing girths for box strapping comprising a mandrel having a T-shaped head, said head being substantially uniform in cross section throughout its length, a pair of opposed formers arranged on opposite sides of said head, an endless conveyer for delivering girth blanks to and forcing them longitudinally through said formers, the blank engaging surfaces of said formers at the point of entrance of a blank being in a plane so as to receive a flat blank between said T-shaped head and said formers, each being provided with a changing contour arranged to roll up the lateral edges of a blank about said mandrel during the passage of a blank through said formers.

In witness whereof, I hereunto subscribe my name this 27th day of May, A. D. 1920.

ALBERT S. KUX.

In witness whereof, I hereunto subscribe my name this 15 day of June, A. D. 1920.

ARTHUR G. G. GUENTHER.